United States Patent [19]

Betts et al.

[11] Patent Number: 5,343,500
[45] Date of Patent: Aug. 30, 1994

[54] NON-LINEAR ENCODER AND DECODER FOR INFORMATION TRANSMISSION THROUGH NON-LINEAR CHANNELS

[75] Inventors: William L. Betts, St. Petersburg, Fla.; Arthur R. Calderbank, Maplewood; Burton R. Saltzberg, Middletown, both of N.J.

[73] Assignee: AT&T Bell Laboratories, Murray Hill, N.J.

[21] Appl. No.: 910,800

[22] Filed: Jul. 9, 1992

Related U.S. Application Data

[63] Continuation-in-part of Ser. No. 754,107, Sep. 3, 1991, Pat. No. 5,265,127.

[51] Int. Cl.⁵ .................. H04L 5/12; H04M 1/22; H03M 7/50
[52] U.S. Cl. .................. 375/39; 341/4; 341/75
[58] Field of Search .................. 375/39, 94; 371/43, 371/37.1; 341/4, 75, 94

[56] References Cited

U.S. PATENT DOCUMENTS

| | | | |
|---|---|---|---|
| 4,631,735 | 12/1986 | Qureshi | 375/34 |
| 4,755,998 | 7/1988 | Gallager | 375/39 |
| 4,873,701 | 10/1989 | Tretter | 375/27 |
| 5,150,369 | 9/1992 | Costa et al. | 371/43 |
| 5,257,263 | 10/1993 | Bazet et al. | 371/43 |
| 5,265,127 | 11/1993 | Betts et al. | 375/39 |

Primary Examiner—Stephen Chin
Assistant Examiner—Amanda T. Le
Attorney, Agent, or Firm—Ronald D. Slusky

[57] ABSTRACT

In order to mitigate against the multiplicative noise effects caused by known non-linearities in a trellis coded data transmission system, a signal constellation is formed by starting with a base constellation whose number of signal points and whose geometry are selected in accordance with conventional criteria and then warping that constellation by adjusting the positions of its signal points in accordance with a warp function which is the inverse of the known component of the non-linear characteristic of the transmission system. Because the constellation warping is deterministic, it is possible for the receiver to "unwarp" the received signal points prior to applying them to the Viterbi decoder. In preferred embodiments, the trellis code is of a type in which the dominant error event is a trellis path error.

6 Claims, 4 Drawing Sheets g = 20 g = 40 g = 60

NON-LINEAR ENCODER AND DECODER FOR INFORMATION TRANSMISSION THROUGH NON-LINEAR CHANNELS

CROSS-REFERENCE TO RELATED APPLICATION

This application is a continuation-in-part of application Ser. No. 07/754,107, filed on Sep. 3, 1991, now U.S. Pat. No. 5,265,127 issued Nov. 23, 1993.

BACKGROUND OF THE INVENTION

The present invention relates to the transmission of data and, in particular, to the transmission of data over voiceband telephone channels using modems.

The telephone network of today is evolving toward the almost exclusive use of digital carrier systems. At the heart of such systems are non-linear analog-to-digital (A/D) converters which encode analog voice and modem signals for digital transmission. For example, the common D4 channel bank uses 64 kilobit per second (KBPS) pulse code modulation (PCM). In addition, many systems specifically engineered for voice transmission use 32 KBPS adaptive differential PCM, or ADPCM. The channel capacity of these two systems is—almost by definition—64 and 32 KBPS, respectively.

It is desirable to be able to use that channel capacity to the maximum possible extent in transmitting data over the voiceband telephone network using analog modems. It has been found, however, that the non-linearities in such systems—particularly the non-linearity deliberately engineered into the A/D converters—serves as a limit on the maximum bit rate that analog modems can obtain while still maintaining a commercially acceptable error rate. This limitation is principally due to the multiplicative effect that the non-linearities have on the noise in the channel. For PCM systems, for example, the presently achievable maximum rate using standard, trellis coding technology appears to be no more than about 28.8 KBPS, notwithstanding the theroretical capability of 64 KBPS.

The prior art has recognized this phenomenon. See, for example, K. Pahlavan et al, "A Method to Counteract the Effects of PCM Systems on the Performance of Ultra High Speed Voice-Band Modems," *IEEE International Conference on Communications*, 1986, Vol. 3, pp. 1592–6, and U.S. Pat. No. 4,660,214 issued Apr. 21, 1987, both of which are hereby incorporated by reference. The Pahlavan et al paper and patent also propose a technique for dealing with the problem. At the heart of that technique is the use of a signal constellation (or "signal structure") whose signal points are non-uniformly spaced in such a way as to compensate for increasing levels of noise associated with signal points that are increasingly distant from the origin. In a specific embodiment of a trellis-coded system which implements their technique, Pahlavan et al use a) a pair of equations derived from a mathematical model of the multiplicative noise phenomenon to position each point in the constellation in conjunction with b) a modification to the distance measurement relation used in the Viterbi decoder. See, in particular, column 8, line 35 to column 9, line 63 of the Pahlavan et al patent.

SUMMARY OF THE INVENTION

Although Pahlavan et al report that their technique provides a significant improvement in modem performance in the presence of multiplicative noise, it is our observation that their way of implementing the general notion of using a non-uniformly spaced signal constellation is disadvantageous in that its attendant modification to the Viterbi decoder distance measurement results in a degradation in Viterbi decoder operation.

The present invention overcomes that disadvantage. A data transmission system embodying the principles of the present invention uses a signal constellation which is arrived at by starting with a base constellation whose number of signal points and whose geometry are selected in accordance with conventional criteria and then warping that constellation by adjusting the positions of its signal points in accordance with a warp function which models the inverse of that component of the non-linear characteristic of the transmission channel which is known a priori. In the case of a PCM system, for example, that component is typically a logarithmic function of the magnitude of the signal being transmitted—the so-called $\mu$-law characteristic. Thus, an inverse logarithmic function, i.e., an exponential function, of the magnitude of the transmitted signal is used to warp the constellation. Indeed, such inverse function is the same function that is used in a conventional $\mu$-law receiver to undo the $\mu$-law encoding carried out at the transmitting end of the system.

Because the constellation warping of the present invention is deterministic, it is possible for the receiver to "unwarp" the received signal points prior to applying them to the Viterbi decoder using the inverse of the warp function and thereby modeling the known non-linear component of the channel characteristic. (In the case of a PCM system, the inverse function is the inverse of the $\mu$-law characteristic and is, more particularly, a logarithmic function.) As a result, the Viterbi decoder can use the standard, unmodified Viterbi decoding algorithm. Advantageously, then, the invention allows the full power of that algorithm to be realized.

In accordance with a feature of the invention, embodiments in which trellis coding is used may advantageously employ a trellis code of a type in which the dominant error event is a trellis path error, as opposed to a parallel transition error. As is explained in detail hereinbelow, it has been found that the improved performance of the inventive constellation warping technique is provided when trellis codes of that type are used.

DETAILED DESCRIPTION

Figure 1:
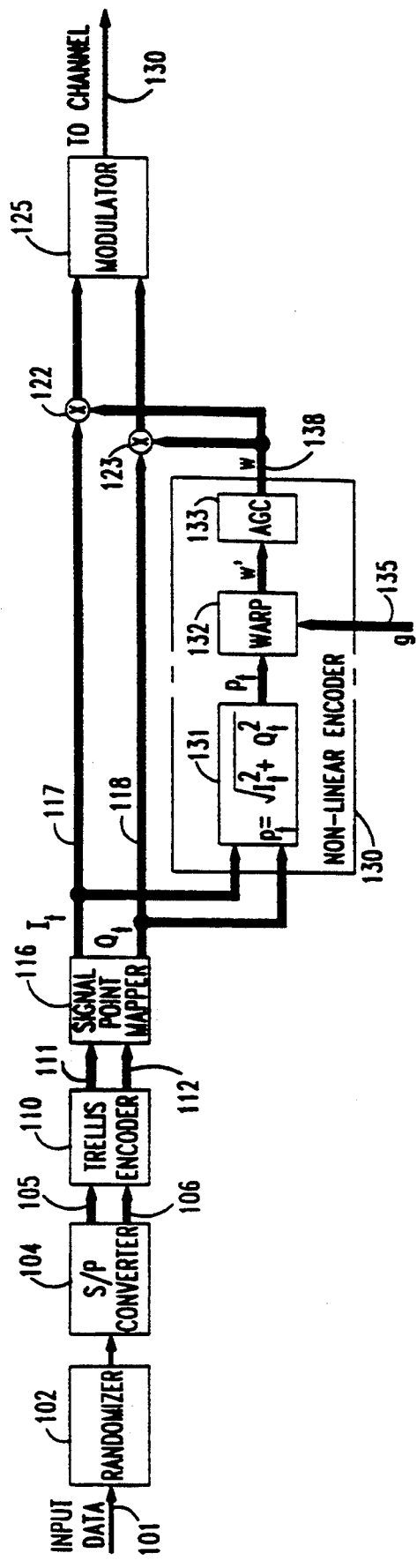
FIG. 1 is a block diagram of a modem transmitter embodying the principles of the invention.

Modem transmitter 100 of FIG. 1 receives a serial stream of binary data at a predetermined input bit rate on lead 101 and generates as its output on lead 130 a voiceband telephone line signal representing a stream of two-dimensional output signal points which, in turn, represent the values of the input bits. This line signal is transmitted over a voiceband telephone channel to modem receiver 200 of FIG. 2, which receives the transmitted line signal from the channel on lead 201, identifies the transmitted signal points and thus, ultimately, recovers the transmitted data stream, which is provided on receiver output lead 223. (In FIGS. 1 and 2, the lighter lead lines represent leads which carry either a single bit or an analog signal, while the darker lead lines each represent some number of parallel leads, each of which carries a single bit or an analog signal).

The data on lead 101 may have originated from, for example, a computer or data terminal. This data stream is processed conventionally by randomizer, or scrambler, 102 and the resulting bit steam is applied to serial-to-parallel (S/P) converter 104 which generates multi-bit output words on each of its leads 105 and 106. Those words are applied to trellis encoder 110.

The words on lead 106 comprise so-called uncoded bits and pass through trellis encoder 110 unchanged onto leads 112. The words on lead 105, however, comprise so-called coded bits, and trellis encoder 110 is a finite state machine which processes the successive words that appear on lead 105 to provide, for each word supplied by S/P converter 104, a word comprising an expanded number of bits on lead 111. (Trellis encoder 110 may also include standard differential encoding circuitry.) In standard fashion, the words on leads 111 and 112 are used by signal point mapper 116 to provide signals on its output leads 117 and 118 identifying the X and Y coordinate values of a particular signal point of a predetermined base constellation, such as the constellation shown in FIG. 3. Those coordinate values are also referred to as in-phase and quadrature-phase, or "$I_t$" and "$Q_t$", the subscript "t" denoting "transmitter."

The $I_t$ and $Q_t$ values on leads 117 and 118 are warped pursuant to the invention by being multiplied by a warp multiplier w generated in accordance with a selected warp function. Specifically, the warp multiplier is generated by non-linear encoder 130, which provides it on lead 138 to multipliers 122 and 123. The latter carry out the aforementioned multiplication and the resulting warped values are applied to modulator 125 which, in standard fashion, generates a modulated line signal representing the stream of warped signal points. That signal is then applied to a voiceband telephone channel via lead 130.

It is presumed that the voiceband telephone channel includes a PCM system so that the overall channel characteristic has a known non-linear component which is a function of instantaneous signal magnitude, that function being the $\mu$-law characteristic. Accordingly, the warp function used by non-linear encoder 130 to generate warp multiplier w is a function of the signal magnitude of the transmitted signal points. That is, the magnitude is an independent variable in the warp function. To this end, non-linear encoder 130 includes magnitude computer 131, which receives the $I_t$ and $Q_t$ values from leads 117 and 118 and determines the magnitude $p_t$ of each signal point by computing the value $p_t = \sqrt{I_t^2 + Q_t^2}$. That value of $p_t$ is then applied to warp generator 132, which receives a warp factor g on lead 135 from within the modem. This factor—which is another independent variable in the warp function—is selected as a function of the degree to which it is desired to warp the overall signal constellation which, in turn, is a function of the known component of the non-linear characteristic of the channel—in this case, the $\mu$-law characteristic. In the present illustrative embodiment, warp generator 132 generates a preliminary warp multiplier w' in accordance with the warp function $$w' = 1 + (8192 P_t^2 + 683 P_t^3 + 137 P_t^4 + 23 P_t^5 + 3 P_t^6)/16\text{-}384$$

where $P_t = p_t/g$.

This relation is a series approximation to the (exponential) inverse of the $\mu$-law characteristic $$w = \frac{e^{P_t} - 1}{P_t}$$

Moreover, where a different non-linear relationship obtains in the channel, a different inverse of that function would be used by warp generator 132. For example, if the channel includes an ADPCM system, where the signal processing algorithm changes over time, as a function of signal magnitude, then the value of g used by warp generator 132 would be adapted in such a way as to model the inverse of that algorithm. The function used by the warp generator could also take into account how one expects noise in the channel to differently affect low- and high-magnitude signal points of the constellation.

Depending on the value of warp factor g and the range of values for $p_t$, it may be the case that multiplying preliminary warp multiplier w' by $I_t$ and $Q_t$ would result in warped signal points that cause the peak and-/or average power limits of the channel to be exceeded. Accordingly, preliminary warp multiplier w' is processed within non-linear encoder 130 by automatic gain control (AGC) 133 to generate the aforementioned warp multiplier w on lead 138. The AGC has a very long time constant, thereby providing a scaling function which, after an adaptation period, will be essentially constant for any given constellation and warp factor g. This serves to impose an upper limit on the value of warp multiplier w which avoids any exceeding of the channel power limits.

Figure 3:
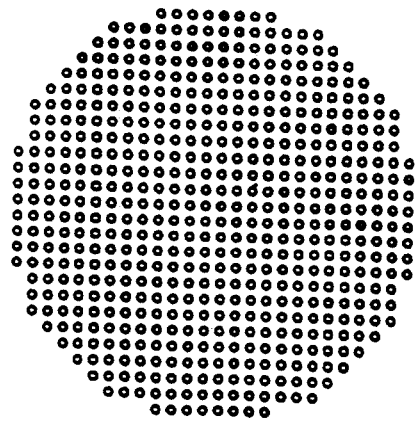
FIG. 3 is a standard 548-point signal constellation.
Figure 4:
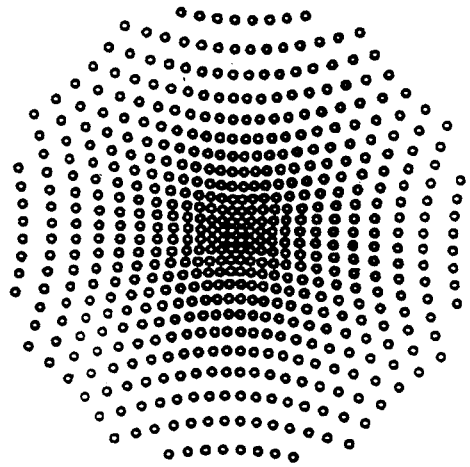
FIGS. 4–6 show various versions of the constellation of FIG. 3 that can be used in the transmitter and receiver of FIGS. 1 and 2, those versions of the constellation having been warped using various warp factors in accordance with the principles of the invention.
Figure 5:
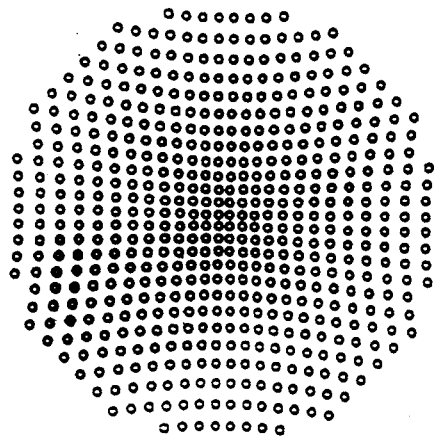
Figure 6:
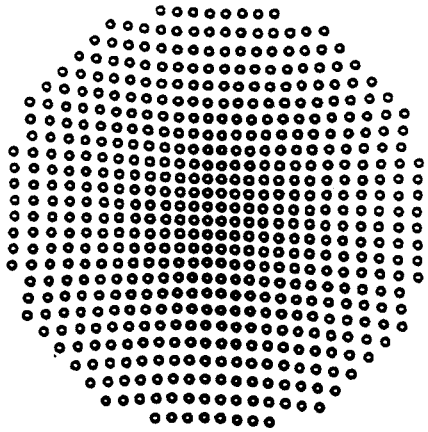

FIGS. 4-6 show the warped versions of the constellation of FIG. 3 that result from the warping just described using different values of warp factor g. The particular value of warp factor g that is used will depend on the application and may be determined empirically. In any case, it will be appreciated that each of the warped signal points of the constellation of FIGS. 4-6 is related to a respective signal point of the base constellation of FIG. 3 in accordance with a predetermined warp function.

Figure 2:
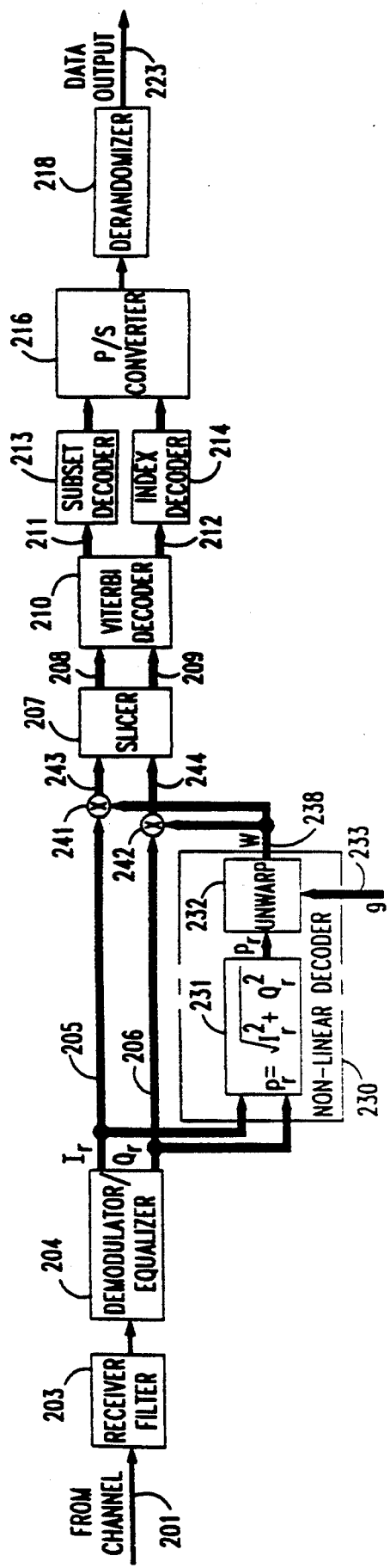
FIG. 2 is a block diagram of a modem receiver embodying the principles of the invention.

Turning, now, to the receiver of FIG. 2, the transmitted line signal is received from the channel on lead 201. The signal is processed in conventional fashion with the exception of the unwarping discussed below. Specifically, the received line signal is applied sequentially to receiver filter 203 and demodulator/equalizer 204. The output of the latter on leads 205 and 206 represents the demodulator/equalizer's best estimate of the in-phase and quadrature-phase components of the transmitted signal points, designated $I_r$ and $Q_r$, the subscript "r" denoting "receiver." These components are "un-warped," in accordance with the invention, by multiplying them by an unwarping multiplier W. Specifically, that multiplier is generated by non-linear decoder 230, which provides multiplier W on lead 238 to multipliers 241 and 242 in a manner described below. Multipliers 241 and 242 carry out the aforementioned multiplication, and the resulting unwarped in-phase and quadrature-phase values on leads 243 and 244 are applied to slicer 207. The job of the latter is to provide, for each of a plurality of predetermined subsets of the signal points of the signal constellation—those subsets being determined in accordance with standard trellis encoding practice—a quantity equal to the distance between the signal point represented by the unwarped in-phase and quadrature-phase values on leads 243 and 244 and the nearest point of each of the subsets. The resulting quantities are thereupon applied on leads 208 and 209 to Viterbi decoder 210 which, upon processing the outputs from slicer 207 over a number of signaling intervals, determines what the most likely sequence of transmitted signal points was.

Because it operates on unwarped signal points, Viterbi decoder 210 can operate on the assumption that those signal points are signal points of the base constellation of FIG. 3. That is, the unwarped signal points are decoded using distance metrics computed with respect to the base constellation, thereby allowing the full power of the Viterbi algorithm to be realized.

In operation, Viterbi decoder 210 provides words on its output lead 211 which identify the subsets to which the signal points successively being decoded belong. At the same time, Viterbi decoder 210 provides words on lead 212 each representing an index which identifies a specific signal point within the subset then being identified on lead 211. (Although not explicitly shown in the FIG., Viterbi decoder 210 may include differential decoding circuitry which provides the inverse function of the aforementioned differential encoding circuitry incorporated within trellis encoder 110 of transmitter 100).

The words on leads 211 and 212 are then decoded by conventional subset decoder 213 and index decoder 214 in order to recover the transmitted data bits. The bits output by decoders 213 and 214 are then converted to serial form by parallel-to-serial (P/S) converter 216 and are de-randomized by de-randomizer 218, which provides the inverse function of the randomizing performed by randomizer 102 in the transmitter. The transmitted data thus recovered is provided on receiver output lead 223.

Referring to non-linear decoder 230, its job is to determine the value of $p_r$ of the received signal points and, armed with a knowledge of the value of warp factor g, to perform the inverse of the warping that was undertaken in the transmitter. Thus, non-linear decoder 230 includes magnitude computer 231, which computes the value of $p_r$ from the received $I_r$ and $Q_r$ values on leads 205 and 206, and unwarp generator 232 which, responsive to the value of warp factor g on lead 233, generates unwarp multiplier W in accordance with the relation $$W = 1 + (-8192P_r + 5461P_r^2 - 4096P_r^3 + 3277P_r^4 - 2731P_r^5 + 2341P_r^6)/16384$$

where $P_r = p_r/g$.

This is the inverse of the relation by which preliminary warp multiplier w' was generated and is a series approximation—usable for $P_r < 1$—to the (logarithmic) $\mu$-law characteristic $$W = \frac{\ln(1 + P_r)}{P_r}.$$

For $P_r \geq 1$, a different approximation would be used.

Note that the value of the magnitude $p_r$ that is used in the expression for unwarp multiplier W is the value computed from the received signal points. This value of $p_r$ will typically be at least a little different from the value used to generate warp multiplier w in the transmitter owing to the noise component superimposed on the received signal points. This means that the amount by which a point is unwarped will be slightly different than the amount by which it was warped. Advantageously, however, this difference is such as to enhance the efficacy of the invention because it will tend to bring the signal points, upon being unwarped, into tighter loci about their corresponding positions in the base constellation than if, for example, the unwarping were to be carried out employing the value of $p_t$ used in the transmitter (assuming that that value could, in fact, be made known to, or could be computed in, the receiver).

The foregoing relates to noise that was superimposed on the transmitted signal points after the $\mu$-law encoding in the channel has been carried out. However, at the point in time that they are subjected to the $\mu$-law encoding in the channel, the transmitted signal points have already been somewhat perturbed due to noise and other channel effects occurring between the transmitter and the codec within the channel in which the $\mu$-law encoding is actually carried out. Thus the warped signal points are not warped from the ideal signal point positions of FIG. 3, but rather from positions that are just a little bit displaced therefrom. Using the inverse of the $\mu$-law characteristic in the receiver does not take account of this. The effect is very minor, so that the approach described hereinabove does work quite well. It is, however, possible to take account of that effect, thereby providing results that are even better.

In particular, it is known that, in the absence of warping, the noise associated with each received signal point—due to the non-linear A/D converter in a PCM system—may be closely represented by an equation of the form $$n = \sqrt{a^2 p^2 + b^2}$$

where n is the root-mean-square (r.m.s.) value of the noise associated with a signal point of magnitude p. The constants a and b depend upon the properties of the communication channel and the transmit and receive filters.

In situations, such as that postulated here, in which the transmission channel superimposes multiplicative noise onto the received signal points, it is advantageous for the warp function and its inverse to be such that, upon warping, the distance between adjacent signal points is proportional to the r.m.s. noise associated with those points. As a result, the noise superimposed on each received signal point is independent of its position in the constellation and the difference of error probabilities associated with different signal points is minimized. If the constellation contains a large number of signal points, this property is achieved by a warp function $$w' = 1 + (2731P_t^2 + 137P_t^4 + 3P_t^6)/16384$$

where $P_t = p_t/g$ and $g = b/a$.

This relation is a series approximation to a hyperbolic sine function $$w = \frac{\sinh P_t}{P_t}.$$

Since the value of a and b are dependent on the communication channel and are generally not known a priori, g may be adapted as before, or may be calculated from measurement of the received noise so as to determine the ratio b/a.

The corresponding receiver unwarp multiplier is generated according to the relation $$W = 1 + (-2731 P_r^2 + 1229 P_r^4 - 731 P_r^6)/16384$$

which is a series approximation to the inverse hyperbolic sine function $$W = \frac{\ln(P_r + \sqrt{1 + P_r^2})}{P_r} = \frac{\sinh^{-1} P_r}{P_r}$$

valid for $P_r < 1$.

After the unwarping operation is carried out, the original constellation with equal spacing of signal points is approximately restored, with approximately equal noise power associated with each signal point.

In accordance with a feature of the invention, the trellis code used by trellis encoder 110 (and in accordance with which the Viterbi decoding is carried out within Viterbi decoder 210) is of a type in which the dominant error event is a trellis path error (as opposed to a parallel transition, as explained in detail hereinbelow). It has been found that the improved performance of the invention is provided when trellis codes of that type are used.

This feature of the invention may be more fully understood from what follows.

Figure 7:
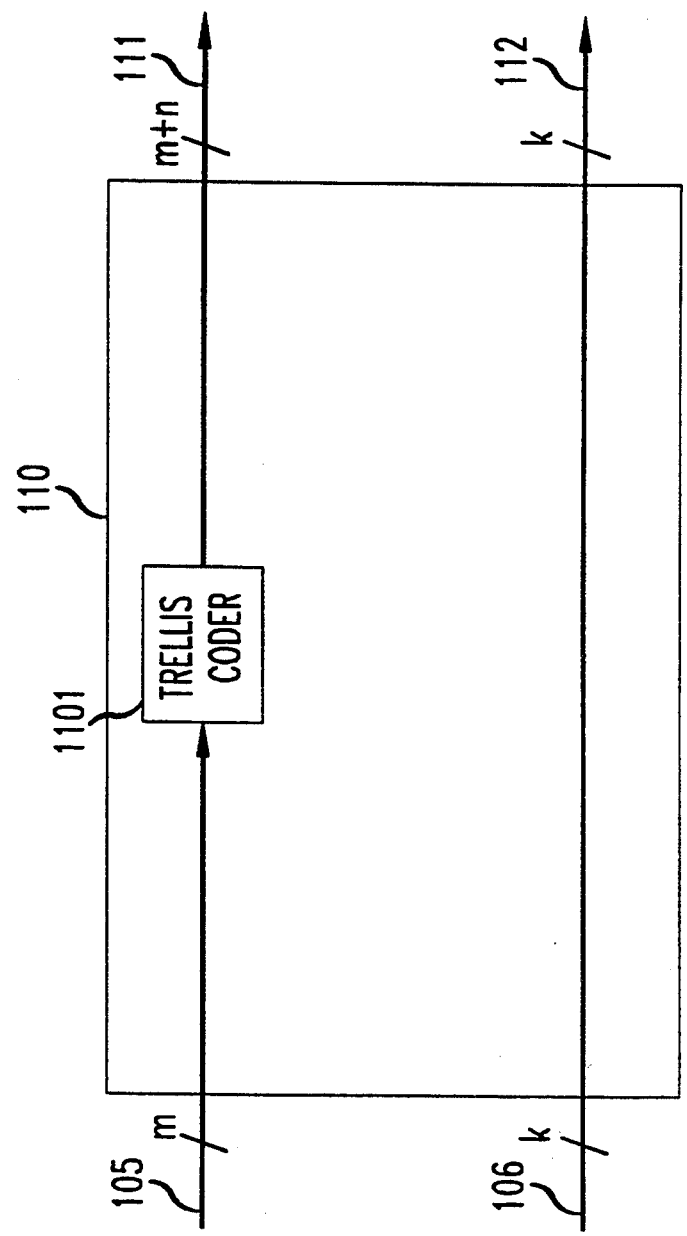
FIG. 7 is a block diagram of the trellis encoder used in the transmitter of FIG. 1.

FIG. 7 is a block diagram of trellis encoder 110 of conventional design. The encoder includes trellis coder 1101 which receives the bits provided on lead 105. Illustratively, lead 105 carries m bits. Trellis coder 1101 provides a total of (m+n) bits on its output lead 111. There are thus $2^{(m+n)}$ possible binary word values on lead 111. The value of each word on lead 111 identifies a particular one of a plurality of subsets of the signal points of the base constellation and, therefore, of the warped constellation. In this example m=2 and n=1 so that the constellation is divided into eight subsets. The sequence of words on lead 111 identify a sequence of these subsets. As previously noted, the bits on lead 106 pass through trellis encoder 110 unchanged onto leads 112. These bits are used to select a signal point from each identified subset. There are k bits on leads 106/112 meaning, then, that each of the subsets comprises $2^k$ warped signal points. The output of trellis coder 1101 is restricted by the trellis code which it implements in such a way that only certain sequences of subsets are allowed.

The operation of Viterbi decoder 210, as described above, is carried out on the basis of the particular trellis code implemented by trellis coder 1101.

The principles underlying the aforementioned feature of the invention may be appreciated by first seeing that, at least for a range of signal-to-noise ratios (SNRs)—including SNRs that are of practical interest—there is no substantial reduction in the immunity to Gaussian noise, even though the inner points of the warped constellation are closer together than they are in the base constellation.

For a given transmitted sequence of signal points, or symbols, let us suppose that the symbol error probability for both the base constellation and the warped constellation is well approximated by $Ce^{-d^2 A}$, where C is an "error coefficient" equal to the average number of nearest neighbors to the transmitted symbol sequence (taken over all possible sequences), and where $d^2$ is the minimum squared distance between distinct signal sequences, and A is a factor determined by the SNR of the channel. In the sequel, an error event that achieves this minimum squared distance will be called a "dominant" error event. Recall that a "nearest neighbor" to a given symbol sequence is another sequence at squared distance $d^2$ from the original sequence, that squared distance, in turn, being simply determined by summing the squared Euclidean distances between corresponding symbols of the two sequences.

Now consider a two-dimensional base constellation in which the (uniformly spaced) signal points are the integer lattice points scaled by $d_1$ and enclosed within a circle of radius 2R. Since the signal points are taken from the integer lattice, each point has four nearest neighbors. Thus, as described above, the probability of symbol error is approximately $4e^{-(d_1)^2 A}$, where $d_1$ is the minimum distance between the uniformly spaced signal points.

Now consider a simplified case of warping in which points within an inner radius R of the constellation (called the "inner points") become closer together and those points between radius R and the outer radius 2R (called the "outer points") become further apart. In such a case ¼ of the points are closer together and ¾ of them are further apart. The new minimum squared distance across the warped constellation is now $(d_2)^2$, where $(d_2)^2$ is equal to $\alpha(d_1)^2$ and $\alpha < 1$. Only points that lay within the circle of radius R before warping have (after warping) nearest neighbors at this new minimum squared distance. Since we are assuming that the symbol error probability is determined by the minimum squared distance and the average number of nearest neighbors, and since outer points have no nearest neighbors at this new minimum squared distance, we can say that the new symbol error probability for the warped constellation is approximately that given by $$\left[\left(\frac{1}{4} \times 4\right) + \left(\frac{3}{4} \times 0\right)\right] \times e^{-(d_2)^2 A} = e^{-\alpha(d_1)^2 A}.$$

We now observe that although the exponent of e has been reduced—thereby tending to increase the symbol error probability—the error coefficient has been reduced from "4" to "1"—thereby tending to decrease the symbol error probability. There is a range of SNR values for which these effects cancel—indeed, this is the range of practical interest alluded to above—so that, as stated above, there is no substantial reduction in the immunity to Gaussian noise.

Figure 8:
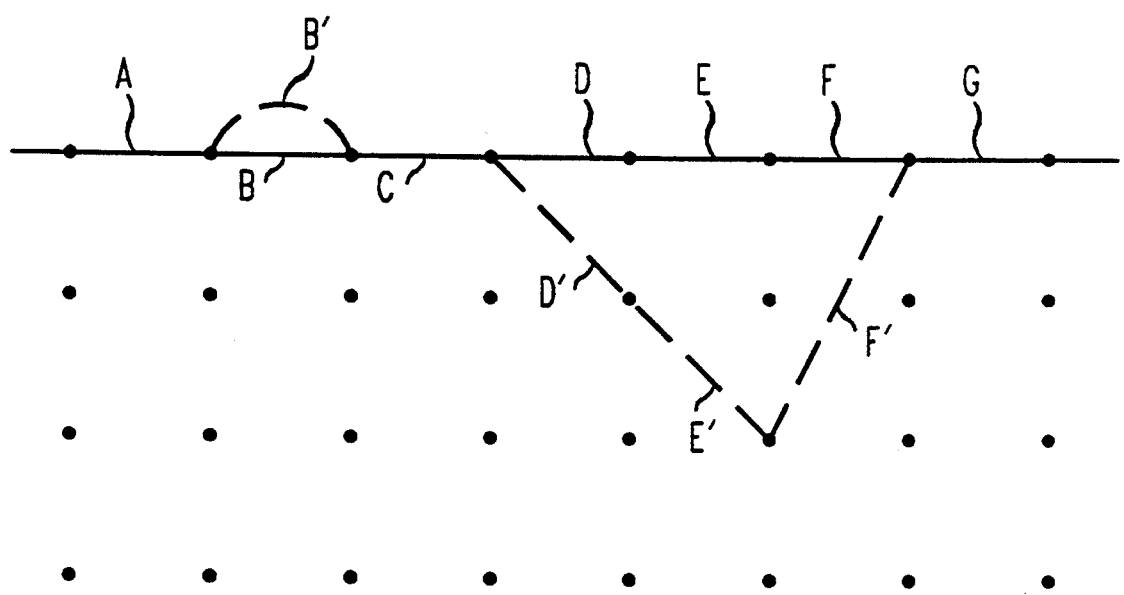
FIG. 8 depicts an illustrative trellis path.

The foregoing analysis has proceeded without reference to trellis coded transmission. However, as will now be shown, it is advantageous—in the case where trellis coding is, in fact, used in a system employing a warped constellation—to select a trellis code for which the so-called dominant error event is a trellis path error, as opposed to a trellis code in which the dominant error event is a parallel transition error. In order to understand this, reference may be made to FIG. 8, which shows, in conventional fashion, a path through the trellis and two erroneous paths, one of which includes a parallel transition error and the other of which includes a trellis path error. The path itself includes edges A, B, C, D, E, F, G. The parallel transition error produces the path including edges A, B', C, D, E, F, G. The trellis path error produces the path including edges A, B, C, D', E', F', G. A parallel transition error corresponds to correct recovery of the subset sequence but erroneous recovery of the transmitted signal point from one of the subsets. A trellis path error corresponds to erroneous recovery of the subset sequence.

We now refer back to the above-introduced example. Again, we are assuming that the symbol error probability is determined by the minimum squared distance and the average number of nearest neighbors at that minimum squared distance. The trellis code, applied to the unwarped, base constellation, magnifies minimum squared distance. Warping reduces that minimum squared distance by a factor $\alpha$. Thus, in calculating the average number of nearest neighbors, i.e., the error coefficient, we realize that if X and Y are signal points in the base constellation and, if after warping, the squared distance between X and Y has been reduced by the factor $\alpha$, then the point X must have been an inner point. Hence, only ¼ of the signal points associated with a trellis edge can be involved in a minimum squared distance error event. This means that the effect of warping is to divide the original error coefficient of the trellis code by a factor $(\frac{1}{4})^L$, where L is the length of the dominant trellis error, thereby reducing the symbol error probability by that factor. If the dominant error is a parallel transition, then L=1. If, however, the dominant error is a trellis path error, then L is given by the number of signaling intervals over which the trellis path error extends. In such a case, L>1. Hence a greater reduction in the error coefficient is achieved. Hence a smaller symbol error probability is achieved. Hence it is advantageous to employ trellis codes for which the dominant error is a trellis path error, and the longer that error, the better.

An example of such a code is the 8-state, two-dimensional code described, for example, in U.S. Pat. No. 4,520,490, issued May 28, 1985 to L. Wei.

The foregoing merely illustrates the principles of the invention. Thus, although logarithmic and sinh functions are discussed herein, other functions may be advantageous in particular circumstances.

Other variations are possible. For example, non-linear decoder 230 may include a two-dimensional hard-limiting function which would, for signal points which fall outside of the perimeter of the warped constellation, cause unwarp multiplier W to take on a value which would bring such points to the perimeter. It can be shown that this approach limits the magnitude of the metrics used by the Viterbi decoder and therefore provides significant improvement with respect to impulse noise.

As another variation, the scaling function provided by AGC 133 could be alternatively achieved by computing its steady-state gain factor from the ensemble of values of p of the various signal points of whatever constellation is selected, and then building that scaling factor into the warping relationship used by warp generator 132. The AGC itself would then not be needed. Simplifying the implementation even further, the warped values of the I and Q components of each of the signal points could be pre-computed and stored in signal point mapper 116 for each different value of warp factor g expected to be used, obviating totally the need for non-linear encoder 130 and multipliers 122 and 123.

In a simple implementation of the invention, warp factor g can be preset in the transmitter and receiver based on the expected characteristics of the channel. In a more sophisticated application, one might adaptively determine g by having the receiver examine the dispersion of the received signal points about the expected signal points and then use that measurement to adapt the value of g in the receiver while making that value known to the transmitter via, for example, conventional diagnostic channel communications between the two modems.

Additionally, although the various functional blocks of the transmitter and receiver are shown for pedagogic clarity as individual discrete elements, the functions of those blocks could and, with present technology, typically would be carried out by one or more programmed processors, digital signal processing (DSP) chips, etc., as is well known to those skilled in the art.

The invention is disclosed in the context of a system using two-dimensional constellations. However, it is equally applicable to systems using constellations of any dimensionality, as will be well appreciated by those skilled in the art.

It is also important to note that the invention is not limited to modem technology but rather to any type of signal transmission system and/or environment in which deterministic, non-linear effects are present.

Thus it will be appreciated that many and varied arrangements may be devised by those skilled in the art which, although not explicitly shown or described herein, embody the principles of the invention and are thus within its spirit and scope.

We claim:

1. Apparatus comprising
   means for receiving a stream of data,
   means for trellis encoding at least a portion of said stream of data using a predetermined trellis code, said trellis code being of a type in which the dominant error event is a trellis path error,
   means for generating a sequence of warped signal points which represent the trellis encoded data, each of the warped signal points being related to a respective signal point of a predetermined base constellation in accordance with a predetermined warp function, and
   means for applying the sequence of warped signal points to a transmission channel having a characteristic which is, at least in part, a non-linear function of magnitude, the warp function being substantially the inverse of that non-linear function.

2. Apparatus comprising
   means for receiving a stream of data,
   means for trellis encoding a first portion of said stream of data, using a predetermined trellis code, to identify a sequence of subsets of the signal points of a warped constellation, each of the signal points of said warped constellation being related to a respective signal point of a predetermined base constellation in accordance with a predetermined warp function, said trellis code having as its dominant error event a trellis path error, means for selecting a signal point from each identified subset of the warped constellation in response to a second portion of said stream of data, and means for applying the selected signal points to a transmission channel having a characteristic which is, at least in part, a non-linear function of magnitude, the warp function being substantially the inverse of that non-linear function.

3. Apparatus for recovering data from a sequence of signal points received from a transmission channel, the characteristic of the channel having a non-linear component, the signal points having been applied to the channel by a transmitter which performs the steps of trellis encoding the data using a trellis code having as its dominant error event a trellis path error, generating a sequence of warped signal points representing the trellis encoded data and applying the sequence of warped signal points to the channel, each of the warped signal points being related to a respective signal point of a predetermined base constellation in accordance with a warp function derived from the non-linear component of the channel characteristic, the apparatus comprising means for unwarping each of the received signal points using substantially an inverse of the warp function, means for Viterbi decoding the unwarped signal points in accordance with said trellis code and using distance metrics computed with respect to the base constellation, and means for recovering the data from the unwarped signal points, wherein the unwarped signal points are signal points of the base constellation.

4. A method comprising the steps of receiving a stream of data, trellis encoding at least a portion of said stream of data using a predetermined trellis code, said trellis code being of a type in which the dominant error event is a trellis path error, generating a sequence of warped signal points which represent the trellis encoded data, each of the warped signal points being related to a respective signal point of a predetermined base constellation in accordance with a predetermined warp function, and applying the sequence of warped signal points to a transmission channel having a characteristic which is, at least in part, a non-linear function of signal magnitude, the magnitude of the signal points of the base constellation being an independent variable in the warp function, the warp function being substantially the inverse of that non-linear function.

5. A method comprising the steps of receiving a stream of data, trellis encoding a first portion of said stream of data, using a predetermined trellis code, to identify a sequence of subsets of the signal points of a warped constellation, each of the signal points of said warped constellation being related to a respective signal point of a predetermined base constellation in accordance with a predetermined warp function, said trellis code having as its dominant error event a trellis path error, selecting a signal point from each identified subset of the warped constellation in response to a second portion of said stream of data, and applying the selected signal points to a transmission channel having a characteristic which is, at least in part, a non-linear function of magnitude, the warp function being substantially the inverse of that non-linear function.

6. A method of communicating data over a transmission channel whose characteristic has a non-linear component, the method comprising the steps of trellis encoding the data using a trellis code having as its dominant error event a trellis path error, and generating a sequence of warped signal points which represent the trellis encoded data, each of the warped signal points being related to a respective signal point of a predetermined base constellation in accordance with a warp function derived from the non-linear component of the channel characteristic, decoding the unwarped signal points in accordance with said trellis code and using distance metrics computed with respect to the base constellation, applying the sequence of warped signal points to the channel, receiving the sequence of warped signal points from the channel, using substantially an inverse of the warp function to unwarp each of the received warped signal points, recovering the data from the unwarped signal points, wherein the unwarped signal points are signal points of the base constellation.

* * * * *